(12) United States Patent
Kenney

(10) Patent No.: US 7,530,761 B2
(45) Date of Patent: May 12, 2009

(54) SYSTEM AND METHOD FOR ELECTRICAL POWER GENERATION UTILIZING VEHICLE TRAFFIC ON ROADWAYS

(76) Inventor: Terry Douglas Kenney, 795 Russell, Milpitas, CA (US) 95035

( * ) Notice: Subject to any disclaimer, the term of this patent is extended or adjusted under 35 U.S.C. 154(b) by 0 days.

(21) Appl. No.: 11/687,503

(22) Filed: Mar. 16, 2007

(65) Prior Publication Data

US 2008/0224477 A1 Sep. 18, 2008

(51) Int. Cl.
*E01C 11/00* (2006.01)
*E01C 9/00* (2006.01)
(52) U.S. Cl. .................. 404/71; 404/17; 404/72
(58) Field of Classification Search ............. 404/17, 404/71, 72; 290/1 R
See application file for complete search history.

(56) References Cited

U.S. PATENT DOCUMENTS

| | | | | |
|---|---|---|---|---|
| 4,130,064 A | * | 12/1978 | Bridwell | 104/154 |
| 4,137,431 A | * | 1/1979 | Pallesen | 381/327 |
| 4,339,920 A | * | 7/1982 | Le Van | 60/533 |
| 4,379,179 A | * | 4/1983 | Pierce et al. | 427/8 |
| 4,409,489 A | * | 10/1983 | Hayes | 290/1 R |
| 4,418,542 A | * | 12/1983 | Ferrell | 60/668 |
| 5,634,774 A | * | 6/1997 | Angel et al. | 417/229 |
| 6,172,426 B1 | * | 1/2001 | Galich | 290/1 R |
| 6,204,568 B1 | * | 3/2001 | Runner | 290/1 R |
| 6,376,925 B1 | * | 4/2002 | Galich | 290/1 R |
| 6,734,575 B2 | * | 5/2004 | Ricketts | 290/1 R |
| 6,936,932 B2 | * | 8/2005 | Kenney | 290/1 R |
| 7,148,581 B2 | * | 12/2006 | Hershey et al. | 290/1 R |
| 2003/0132636 A1 | * | 7/2003 | Ricketts | 290/1 R |

* cited by examiner

*Primary Examiner*—Raymond W Addie
(74) *Attorney, Agent, or Firm*—Orrick, Herrington & Sutcliffe, LLP

(57) ABSTRACT

A system and method for electrical power generation utilizing vehicle traffic on roadways is disclosed. According to one embodiment, a power generation system comprises one or more standard hydraulic cylinders, one or more electro-mechanical generators, and one or more hydraulic accumulators coupled to a hydraulic motor.

5 Claims, 11 Drawing Sheets

SYSTEM AND METHOD FOR ELECTRICAL POWER GENERATION UTILIZING VEHICLE TRAFFIC ON ROADWAYS

FIELD

The present invention relates to methods and systems for power generation. More particularly, the present invention is a method and system for power generation including electrical power generation such as by utilizing vehicle traffic on roadways.

BACKGROUND

Energy sources useful for the generation of electricity include wind, water, solar, nuclear and steam energy and various methods and systems have been developed for harnessing such energy to generate electricity, typically by performing useful work to drive an electric generator.

With the continuing need for energy consumption efficiency and conservation, many efforts have been made to exploit previously unused energy sources. Many methods and systems have been proposed for the harnessing of existing forces or mechanical work to generate electrical power. In particular, several systems and methods have been developed to use the energy and downward force of the wheels of vehicles as they move along a roadway surface.

The systems can be categorized generally as mechanical systems, air compression systems and hydraulic systems.

Mechanical Systems.

Mechanical systems for generating electric power from the downward force of vehicles passing over a roadway typically involve gear mechanisms and other moving parts and are prone to wear and tear from the stress of forced downward movement in response to vehicles and forced upward movement when being reset. One example is U.S. Pat. No. 4,238,687 to Martinez, which discloses a system for generating electric power from the passage of motor vehicles over a roadway using turbines that are driven by the downward rotational movement of arc-shaped arms connected to rocker plates installed on a road surface when such rocker plates are forced down by vehicles passing over them.

Air Compression Systems.

Air compression systems typically involve an air compression piston being driven by an actuator of some sort that translates the downward force of a vehicle passing over a roadway in which the actuator is installed. For example, U.S. Pat. No. 4,173,431 to Smith discloses a road vehicle-actuated air compressor and system for using compressed air to operate an electrical generator to generate electricity. The road vehicle-actuated compressor includes an actuator that is pushed downward by the weight of a vehicle passing over it, driving a reciprocating piston in a cylinder, compressing the air in the cylinder. An electric generator is driven by compressed air from the cylinder. Another example is U.S. Pat. No. 5,634,774 to Angel et al. which discloses a road vehicle actuated air compressor which utilizes flaps mounted in pairs in a road or pedestrian walkway surface. When traffic moves over the flaps, the flaps move downward to activate a piston which compresses air. The compressed air is stored and used as needed to generate electricity. Air compression systems, while generally somewhat more durable than mechanical systems, are not efficient in maximizing the amount of energy translated from the downward forces of moving vehicles to drive an electrical generator, due to friction and other losses.

Hydraulic Systems.

Several systems utilize hydraulic pumps to absorb the downward force of vehicles passing over a roadway and translate that force into useful work, such as to drive an electric generator. For example, U.S. Pat. No. 4,004,422 to Le Van discloses a method and apparatus for producing useful work utilizing the weight of moving traffic by incorporating in a roadway or traffic-way a readily deformable chamber which is filled with a fluid, arranged so that the weight of the vehicle passing over it causes displacement of the fluid contained therein. The energy of the displaced fluid in turn is translated into mechanical or electric energy. U.S. Pat. No. 4,130,064 to Bridwell discloses a system for utilizing the weight and momentum of moving vehicles to produce usable energy comprising a fluid displacement pump positioned either under a moveable plate in a roadway or between the rail in a railbed in a railway which compresses hydraulic fluid as the vehicle passes over, a low pressure line for supplying fluid to the pump chamber, a high pressure outlet line communicating with the chamber and connected to a manifold which is supplied with high pressure fluid from a number of other similar pumps and which directs the fluid to an energy conversion device such as a fluid motor and electric generator. The invention teaches use of a dual-stroke pump actuated depending on the weight of the passing vehicles. The dual-stroke pump allows greater volumes of hydraulic fluid to be pressurized depending on the weight of the passing vehicle.

Similarly, U.S. Pat. No. 4,211,078 to Bass is directed to a power source comprising a cylinder arranged to pump hydraulic fluid into a pressure accumulator. The stored hydraulic fluid operates a hydraulic motor to drive an alternator to generate electric power. The cylinder can be a single acting cylinder having a piston rod depressed by the weight of passing traffic on a highway. The system uses an accumulator and a hydraulic motor which drives an alternator to generate electric power. U.S. Pat. No. 4,409,489 to Hayes discloses an apparatus which pressurizes fluid and causes it to flow by capturing energy dissipated by moving vehicles, comprising a network of collapsible bodies containing hydraulic fluid attached to a turbine generator system. The collapsible bodies are resilient tubes, preferably three-part structures made of elastic inner tubes with projections and outer sections of semi-rigid hose. The claimed improvement is in the use of a network of numerous collapsible bodies to capture more weight from passing vehicles.

More recent efforts include U.S. Pat. No. 6,172,426 to Galich, which discloses an energy platform system for generating electrical energy from the weight of a moving vehicle comprising a fluid bed containing a volume of fluid which is compressible by the weight of a moving vehicle driven over it. Fluid forced from within the bladder as a result of such compression passes through a circulation system where the moving fluid is used to drive a generator. The circulation assembly comprises an accumulator in fluid communication with the bladder, which receives the forced fluid and releases it at a specified pressure level. A hydraulic pump and reservoir are also used. The electrical generator is a linear generator, comprising an elongate cylinder having a hollow interior. The exterior of the cylinder has a coil around it. A rod is inserted within the cylinder and has a magnet slidably coupled to it. As the rod in the cylinder is moved by the hydraulic fluid, the magnet moves as well, causing an electrical current within the coil. U.S. Pat. No. 6,204,568 to Runner discloses a system for converting mechanical motion of vehicles into electrical energy, comprising a plurality of motion converter assemblies each including a rod which remains in communication with a vertical motion delivery mechanism through a gearing mechanism for rotating the rod in response to vehicle traffic passing over the system, a plurality of fluid pumps each connected to the rotating rod to generate pressurized fluid which in turn drives a turbine generator. The motion converter assemblies have a rectangular base and sides forming a box and are inserted in the road surface. The motion converter assemblies also have a pair of rectangular top plates that are pivotally connected at one end to one side of the motion connection assembly base, with springs urging the plates upward. The top plate has a vertical plate pivotally connected to its under side which has teeth to engage a gear. When a vehicle passes over the top plate of a motion converter assembly, the vertical plate is driven downward and engages the gear, which rotates and drives the fluid pumps.

These previously described systems, while in principle capable of generating electrical power from the downward force of vehicles as they pass over a roadway, are inefficient in their ability to maximize the electrical power generated from each passing vehicle. Vehicles have varying weights; the downward force of a semi-truck is obviously considerably more than that of a compact car. Prior systems do not effectively harness the full force of each vehicle. Additionally, because vehicle traffic is typically irregular, there is an increased need in such a system to maximize the transfer of energy from each vehicle and store energy to provide a steady supply of electric power. U.S. Pat. No. 6,936,932 to Kenney discloses an system and method for generating power, such as electrical power, from downward vehicle forces on a roadway that effectively harnesses the energy of vehicles of varying weights, which system utilizes (a) two or more types of electric hydraulic cylinders, the differing types of cylinders being designed to provide maximum energy conversion efficiency at differing vehicle weights; and (b) a weight sensor which enables the system to select the most efficient cylinders for each passing vehicle. While this system maximizes the transfer of energy from passing vehicles of varying weights, it does not maximize efficiency from passing vehicles which are traveling at varying speeds. While hydraulic cylinders provide efficient energy conversion for passing vehicles at very low speeds, they are not efficient at higher speeds.

Embodiments of the present invention are systems and methods for generating power, such as electrical power, from downward vehicle forces on a roadway that effectively harnesses the energy of vehicles of varying weights which are traveling at varying speeds. Embodiments of the present invention may overcome the shortcomings of prior efforts by employing (i) multiple hydraulic cylinders of different load bearing and hydraulic fluid compression capacities that are selectively activated by a sensor system depending on vehicle weight in a novel combination and configuration with electro-mechanical generators (any device designed to covert mechanical motion into electricity), including linear generators, and a road plate over which vehicles pass; or (ii) multiple hydraulic cylinders whose fluid output is directed to a servo-controlled pressure regulator, such regulator being controlled by signals from a vehicle speed sensor and road plate motion sensor to effectively vary the resistance presented by the hydraulic cylinders to the weight of the passing vehicle such that each vehicle, no matter its weight or speed, fully depresses the road plate to the maximum extent of its travel thereby maximizing the amount of energy extracted from each passing vehicle. Embodiments of the present invention can effectively harness the downward force of both stationary and moving vehicles of varying weights and at both low and high speeds.

SUMMARY

The present disclosure includes methods and apparatuses for power generation systems.

According to an aspect a power generation system comprises a hydraulic accumulator, a hydraulic reservoir; electric hydraulic cylinders having various weight-handling capacities, a vehicle weight sensor and electro-mechanical generators.

According to a further aspect, a method for power generation comprises providing electric hydraulic cylinders, sensing a weight, selecting cylinders and directing hydraulic fluid to them and using the weight to pressurize hydraulic fluid, and additionally using the weight to operate electro-mechanical generators.

According to an alternative aspect a power generation system comprises a hydraulic accumulator, a hydraulic reservoir; standard hydraulic cylinders, a vehicle speed sensor and road plate motion sensor.

According to a further aspect, a method for power generation comprises providing standard hydraulic cylinders, sensing a vehicles speed and the rate of downward motion of a road plate, adjusting a servo-controlled pressure regulator fluidly connected to such hydraulic cylinders, and using the weight of the vehicle to pressurize hydraulic fluid.

According to a still further aspect a power generation system is disclosed, which may comprise a hydraulic fluid accumulator.

BRIEF DESCRIPTION OF THE DRAWINGS

For simplicity in description, identical components are labeled by identical numerals in this document.

DETAILED DESCRIPTION

Figure 1:
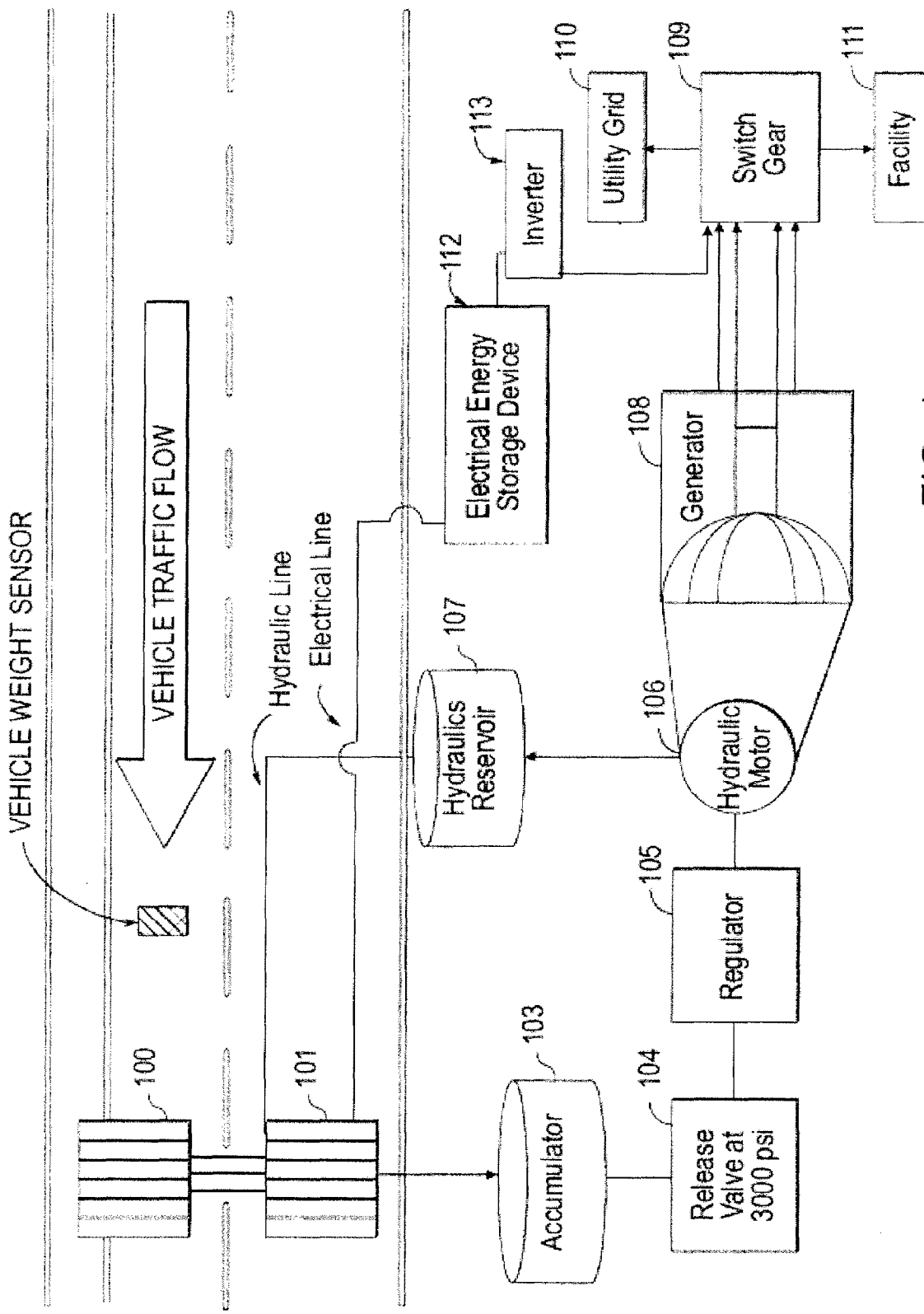
FIG. 1 is a diagram depicting certain components of a preferred embodiment of the present invention.

In the following description, for purposes of clarity and conciseness of the description, not all of the numerous components shown in the schematic are described. The numerous components are shown in the drawings to provide a person of ordinary skill in the art a thorough enabling disclosure of the present invention. The operation of many of the components would be understood and apparent to one skilled in the art.

An embodiment of the present invention provides a system and method for electrical power generation utilizing vehicle traffic on roadways. The system of the present invention, in a preferred embodiment may comprise several main components such as a road plate comprising one or more steps and/or arms having electric hydraulic cylinders and electro-mechanical generators disposed within them that are actuated when vehicles pass over the road plate and a vehicle weight sensor system that activates specific electric hydraulic cylinders of varying weight handling capacities depending on the vehicle weight sensed by such sensing system; a power generation system that may include a self-contained hydraulic system; and may include an electrical power transmission system.

Road Plate

Referring to FIG. 1, which is a general block diagram of the overall system, the road plate component 101 is designed to capture the weight of vehicles passing over it. Multiple road plate components can be used.

Figure 2:
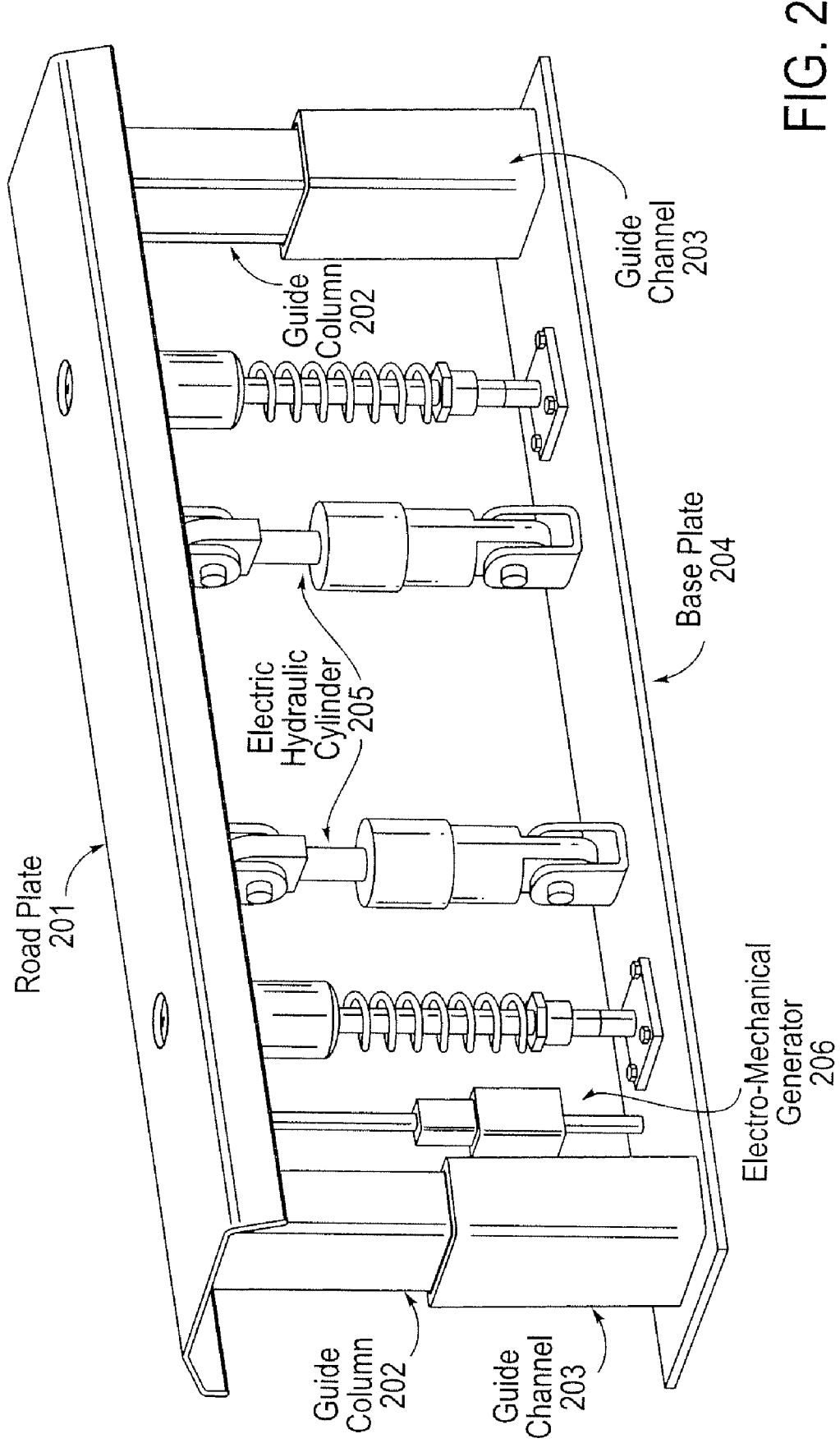
FIG. 2 is a diagram depicting the road plate component and its subcomponents in a preferred embodiment of the road plate component.
Figure 7:
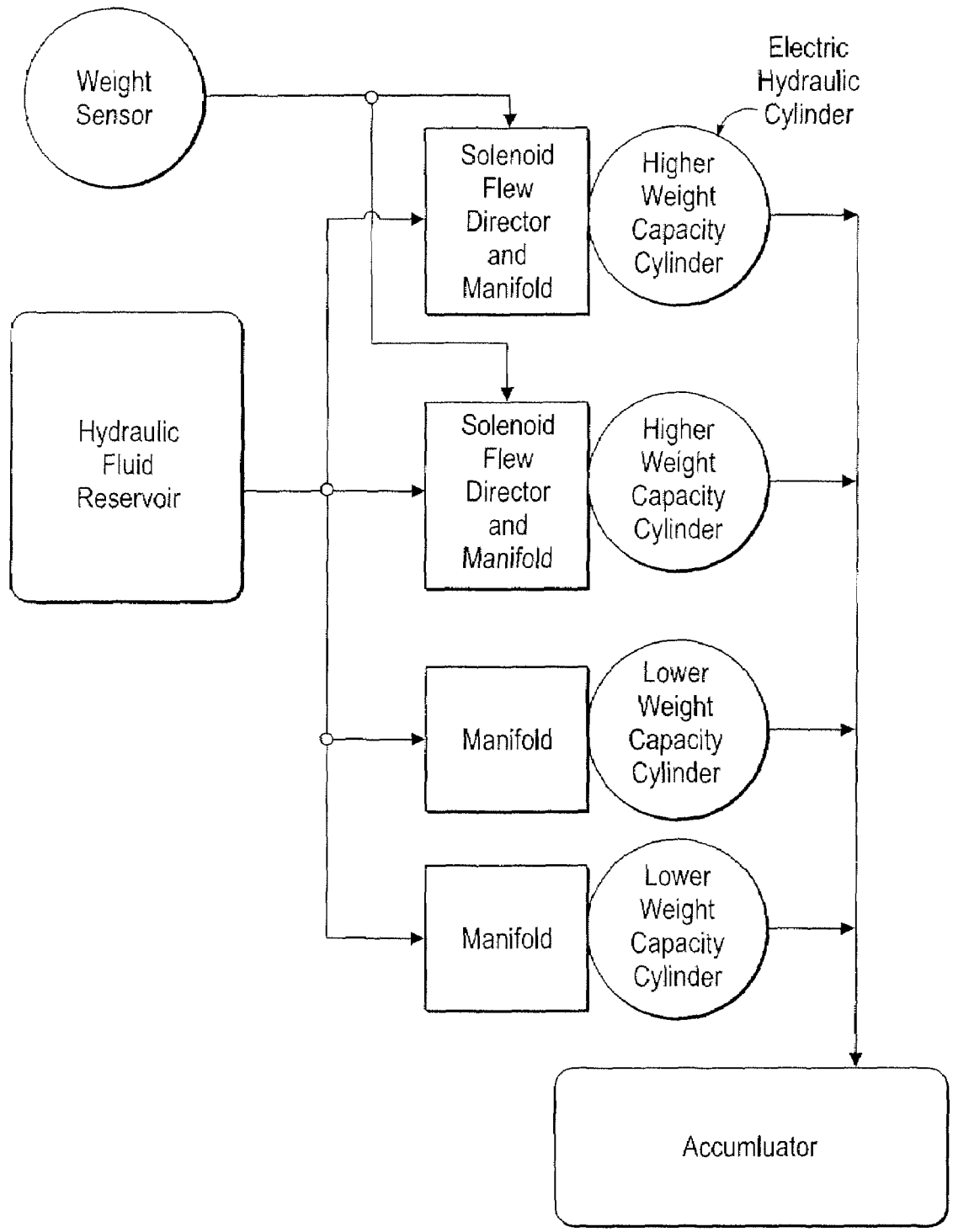
FIG. 7 is a block diagram that shows the relationship between some components of an embodiment.
Figure 8:
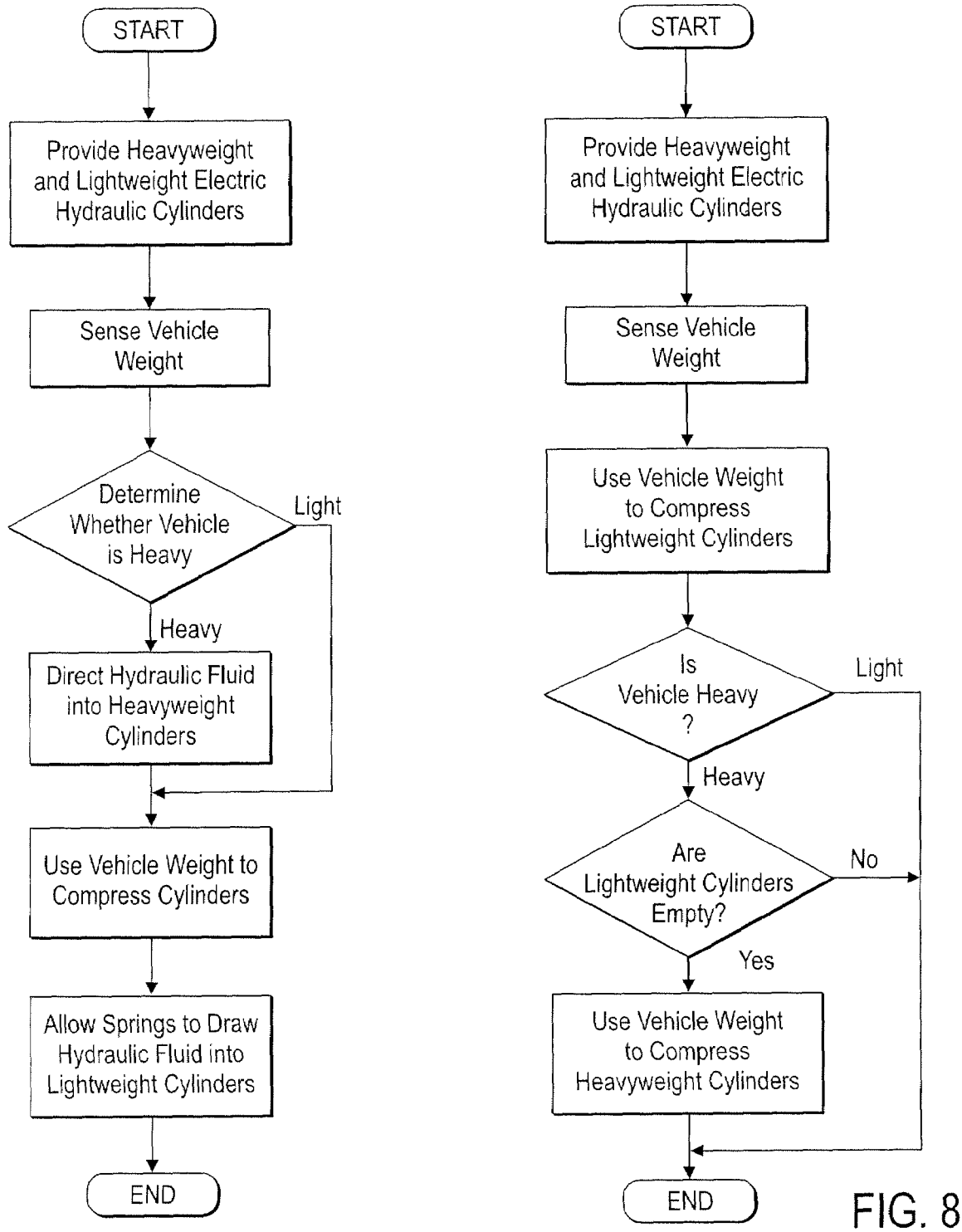
FIG. 8 is a flow diagram for two embodiments.

Referring to FIG. 2, in a preferred embodiment, the road plate component comprises the following main subcomponents: a road plate 201, rigidly connected to two guide columns 202, each of which are slidably arranged within a guide channel 203, a base plate 204, with two or more electric hydraulic cylinders 205 and one or more electro-mechanical generators 206 interconnected between the base plate and the road plate. As depicted in FIG. 1 and FIG. 7, a vehicle weight sensor system activates specific electric hydraulic cylinders of varying weight handling capacities depending upon the vehicle weight sensed by such sensing system. In one embodiment, one or more piezo-electric traffic sensors may be utilized. Other known sensing mechanisms and systems can be utilized as well. Although the number of hydraulic cylinders can vary, each road plate is preferably attached to four electric hydraulic cylinders. The road plate subcomponents are preferably constructed from welded aluminum or steel, although other rigid and durable materials such as plastics, fiberglass and other metals and composite materials can be utilized. When a vehicle drives over and depresses a road plate, the electric hydraulic cylinders are forced to retract and the electro-mechanical generators are operated by the motion of the road plate. Coil springs are used in one embodiment to force the road plate and guide columns upward to their extended position after being forced down by passing vehicles. Shocks, struts and hydraulic return systems can also be used to perform this function.

Electric Hydraulic Cylinders

Figure 3:
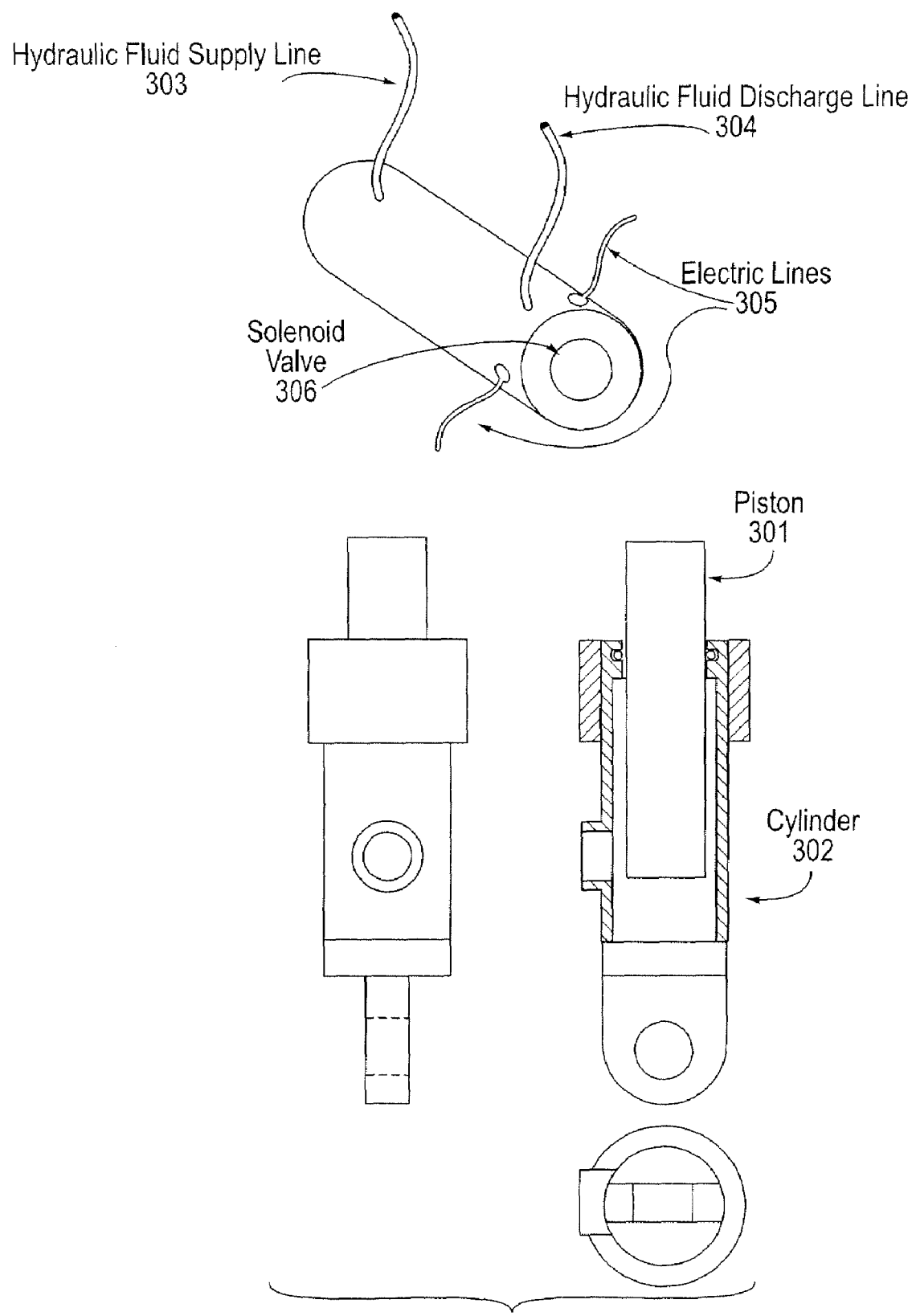
FIG. 3 depicts a side perspective and cross-sectional view of a preferred embodiment of the electric hydraulic cylinder.

Referring to FIG. 3, the electric hydraulic cylinders themselves are preferably made of metal or other materials known to be suitable for such applications, and have a piston 301 slidably disposed within a cylinder 302, a hydraulic fluid supply line 303 and a hydraulic fluid discharge line 304, and electric lines 305 connected to the solenoid valve 306. Hydraulic fluid is supplied to fill the cylinder from the hydraulic fluid reservoir 107 depicted in FIG. 1. The electric hydraulic cylinders are activated by the vehicle weight sensing system based on the vehicle weight sensed and when the sensed vehicle passes over the road plate within which the particular activated cylinder is disposed, the cylinder piston is forced downward in the cylinder forcing hydraulic fluid through the hydraulic fluid discharge line to the designated accumulator of the power generation system component.

The number of electric hydraulic cylinders used, as well as their size and force handling capacity can vary and can be configured to meet the needs of the desired application. For example, a plurality of electric hydraulic cylinders can be interconnected to a single circulation assembly or manifold or can be connected to respective individual circulation assemblies or manifolds for redundancy of operation.

As vehicles move across the road plate component containing hydraulic cylinders, the weight of the vehicle is captured by the electric hydraulic cylinders that feed pressurized fluid into the power generation system component. As a vehicle passes over the weight sensor, the sensor sends a signal to a solenoid switch to direct the operation of a flow director to direct the flow of hydraulic fluid to the appropriate hydraulic cylinders based on the weight of the vehicle. Various flow director manifold components available on the market can be utilized in the present invention. In one embodiment, an integrated hydraulic manifold flow divider manufactured by Moog, Inc. is used.

Electro-Mechanical Generators

Figure 4:
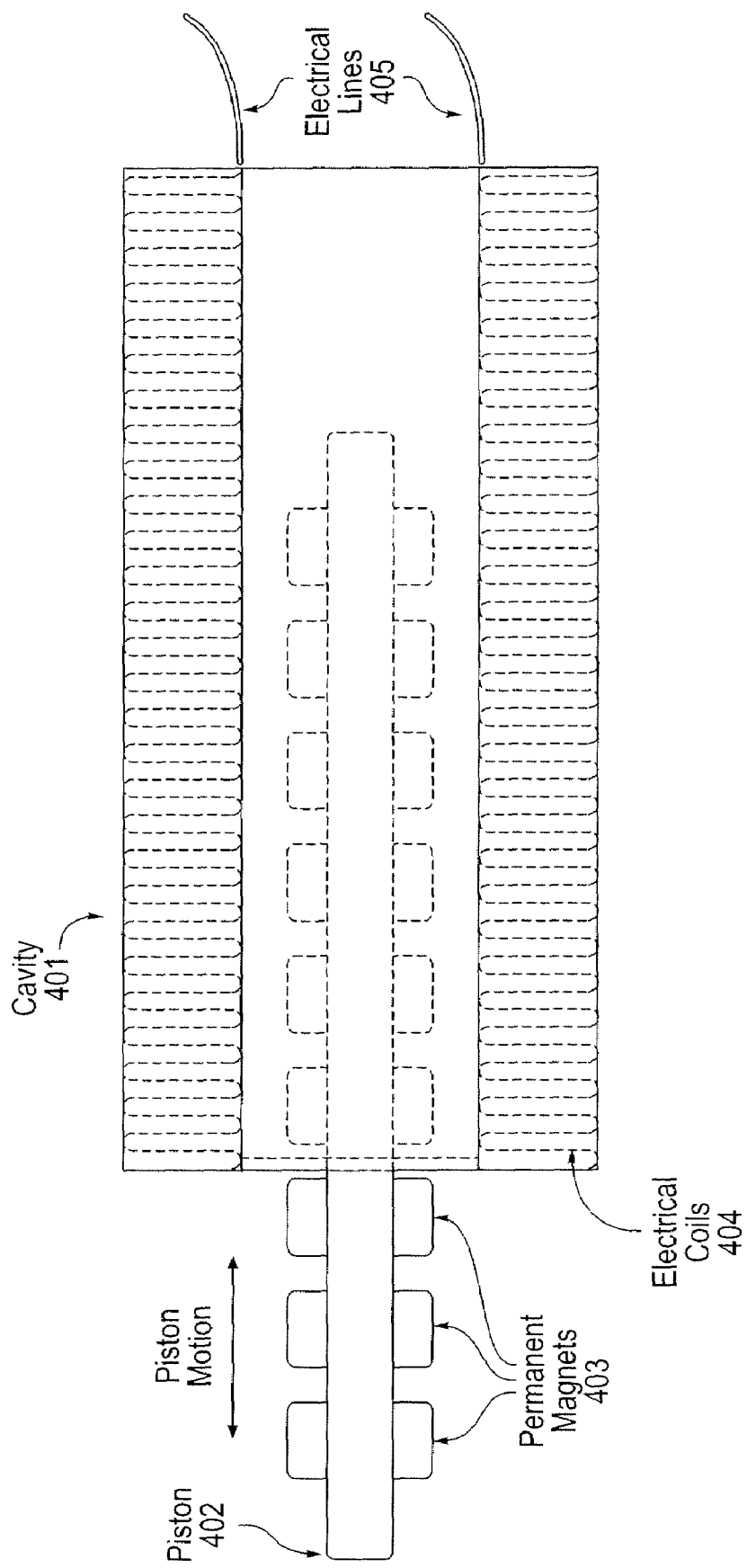
FIG. 4 is a diagram depicting a preferred embodiment of the electro-mechanical generator.

Referring to FIG. 4, the electro-mechanical generators are linear generators, which are comprised of a cavity 401, a piston 402 slidably disposed within the cavity, permanent magnets 403 which are arranged on the piston, electrical coils 404 arranged within the cavity 401, and electrical lines 405 connected to the electrical coils 404.

The number of electro-mechanical generators used, as well as their design, size and force handling capacity can vary and can be configured to meet the needs of the desired application. For example, a plurality of electro-mechanical generators can be interconnected to an electrical bus assembly for collection of the electrical output of the generators. Alternate designs, such as conventional rotational electro-mechanical generators may be used as well.

As a vehicle passes over a road plate, the downward motion of the road plate causes the electro-mechanical generator's piston to move within the cavity, generating an electrical current in the electrical coils by the principle of magnetic induction. The resulting electrical current is used to charge an electrical energy storage device, such as a battery or capacitor, for later use or delivery to an electrical utility supply grid.

Power Generation System.

Figure 5:
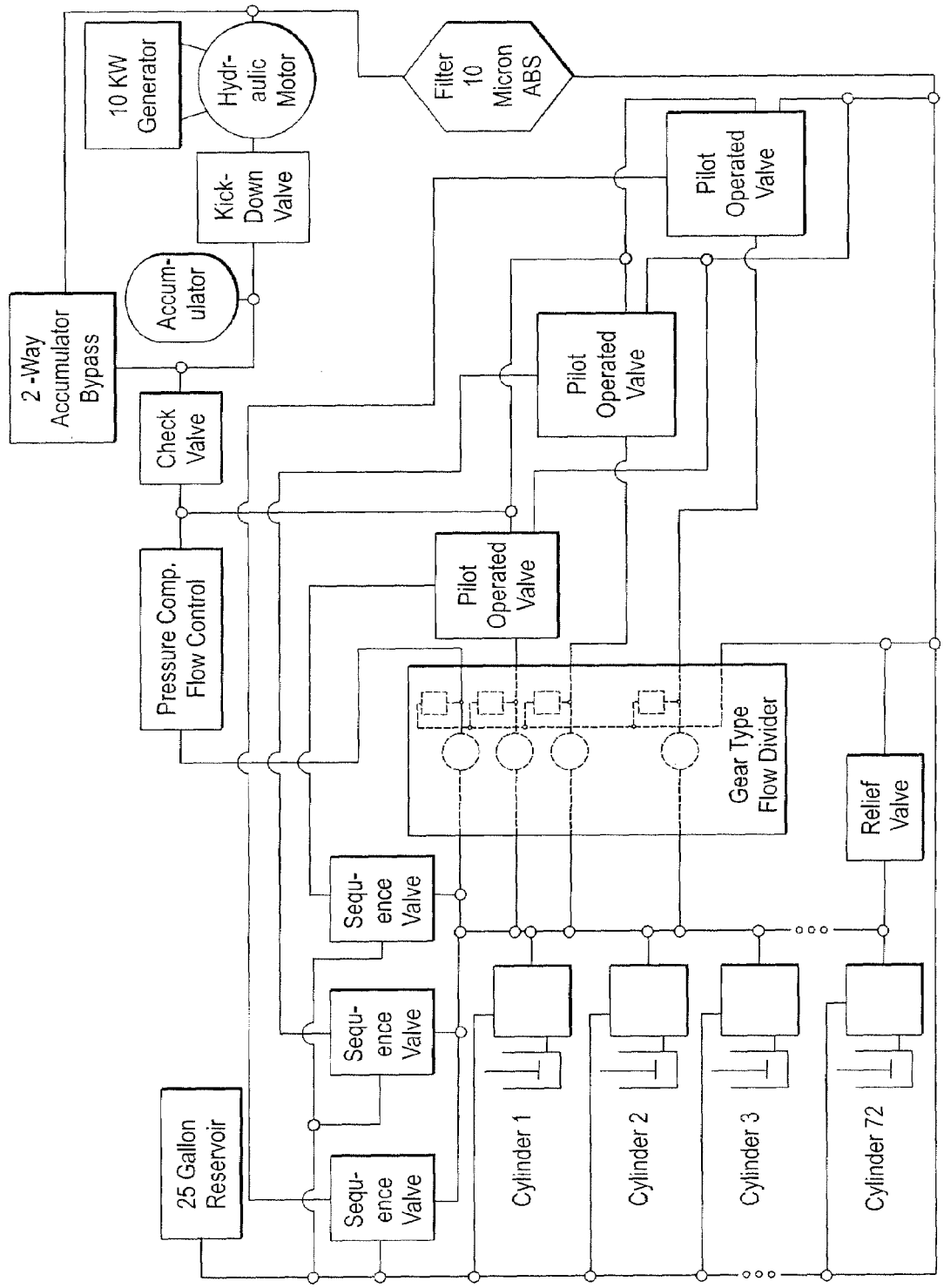
FIG. 5 is a diagram of the hydraulic system of an embodiment of the present invention in a preferred embodiment.
Figure 6:
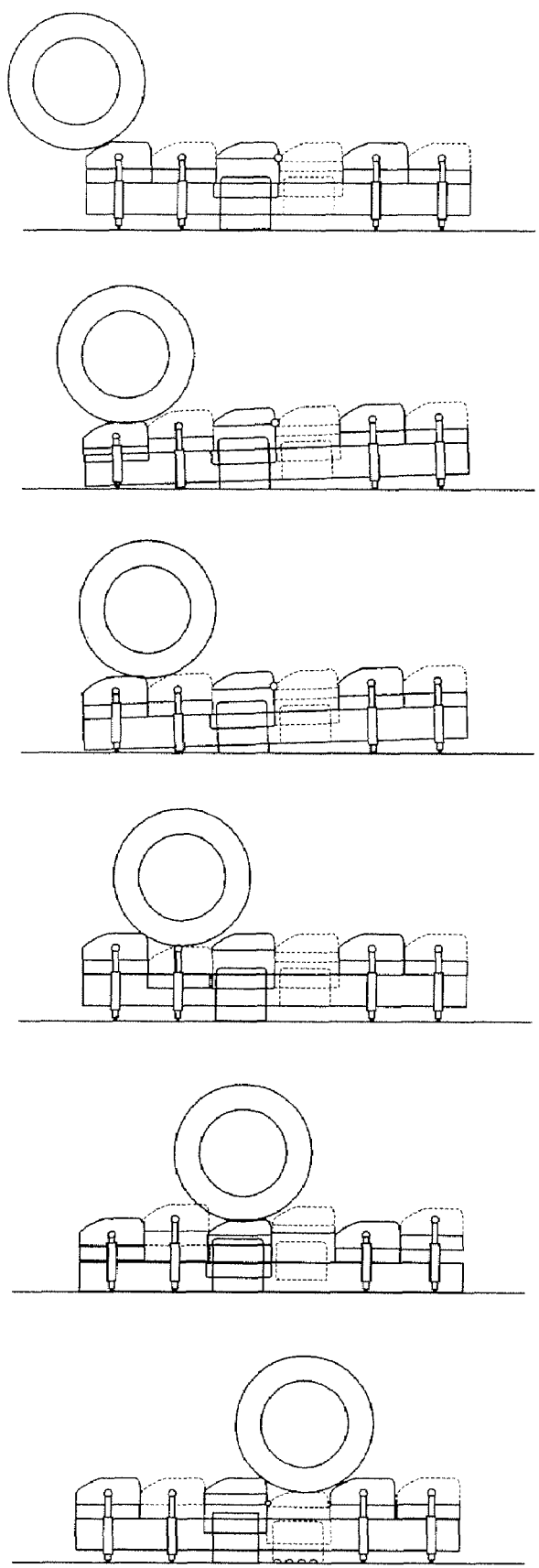
FIG. 6 depicts the road plate action when a vehicle passes over it.

FIG. 5 is a block diagram that shows the relationship between some components of an embodiment, including: (1) a reservoir to contain a supply of hydraulic fluid, (2) one or more electric hydraulic cylinders, (3) a flow divider designed to increase the pressure and reduce the volume of the hydraulic fluid expelled by the electric hydraulic cylinders, (4) a hydraulic fluid accumulator for storing hydraulic fluid at a high pressure, (5) a "kick-down" valve which releases the high-pressure hydraulic fluid from the accumulator when the pressure in the accumulator reaches a predetermined level, (6) a hydraulic motor which is fed high-pressure hydraulic fluid from the accumulator through the "kick-down" valve, and (7) an electric generator which is driven by the hydraulic motor.

Referring to FIG. 1, a power generation system comprises one or more accumulators 103; a hydraulic motor 106, and an electricity generator 108 driven by the hydraulic motor 106. A pressure control/release valve 104 and regulator 105 control accumulation and release of hydraulic pressure. The accumulators are pre-pressurized to a set limit, store the energy until maximum capacity is reached at which time they discharge, release the pressurized hydraulic fluid, and operate the hydraulic motor 106. The hydraulic motor 106 operates based on the amount of pressure released and subsequent free flow, which turns a generator 108 to produce electricity. The accumulators are connected to the electric hydraulic cylinders by hydraulic fluid supply lines and connections. Each different weight of vehicle has the potential to generate a different amount of pressure in the hydraulic cylinders. This is captured and turned into a uniform pressure charging the accumulators. To accomplish this, a gear type flow divider is preferably used to intensify the pressure when a light vehicle passes over the road plate component. For example, a light vehicle passes over the mechanism and generates 500 PSI of pressure and 3.14 cu. inches of volume. The flow divider will reduce the flow to about 0.785 cubic inches but will increase the pressure to 2000 PSI. Sequence valves sense the pressure generated by the vehicle and control the flow from each section of the flow divider accordingly. The accumulators start with a set precharge and increase in pressure to a desired setting. The kickdown valve 104 at the accumulator outlet opens when the desired pressure level is reached and spins the hydraulic motor 106 which turns the generator 108. The hydraulic motor also supplies hydraulic fluid to a hydraulic fluid reservoir 107 which in turn provides a supply of hydraulic fluid to re-fill the electric hydraulic cylinders.

The power generation system also includes one or more electro-mechanical generators electrically connected to one or more electrical energy storage devices 112, such as a battery or capacitor, which in turn are electrically coupled to an inverter device 113 capable of converting direct current into alternating current. When the electrical energy storage devices 112 reach their maximum capacity, the inverter device 113 is engaged and electricity is provided to the electrical utility supply grid.

Electrical Power Transmission System.

The electrical power transmission system component comprises a switch gear mechanism 109 and an electrical conduit junction in communication with an electrical utility supply grid 110. The generator 105 and inverter device 113 are connected by known electrical connectors through a switching gear 109 to an existing electrical facility junction box 111 or electrical utility grid 110 to supply electricity. To further enhance the generation of electricity, a solar panel can be added to the power plant component.

The system is a closed modular designed unit. The road plate can be divided into sections. The system can be pre-assembled on a 10 foot by 8 foot skid which would include the accumulator, hydraulic motor and generator. The road plate can be installed in sections with minimal cuts to the roadway and conforms to the profile of the road.

Method for Generating Electricity Using System.

A method for generating electricity involves driving a vehicle over a road plate component having one or more road plates with electric hydraulic cylinders having varying weight handling capacities, and one or more electro-mechanical generators disposed within them that are actuated when a vehicle travels over the road plate. A vehicle weight sensor system activates one or more electrical hydraulic cylinders depending on the vehicle weight sensed by the sensor system. The downward motion of the road plate is converted into electrical energy using the electro-mechanical generators whose electrical energy is stored in one or more electrical energy storage devices. The hydraulic pressure created by the electric hydraulic cylinders is transferred when a vehicle travels over the road plate from the electric hydraulic cylinders to a power generation system comprising one or more accumulators connected by hydraulic fluid supply lines to the electric hydraulic cylinders to receive and store pressurized hydraulic fluid supplied by the electric hydraulic cylinders. A hydraulic motor is driven by pressurized hydraulic fluid supplied by the accumulators. An electricity generator is driven by the hydraulic motor to generate electricity.

Standard Hydrolic Cylinders

Figure 9:
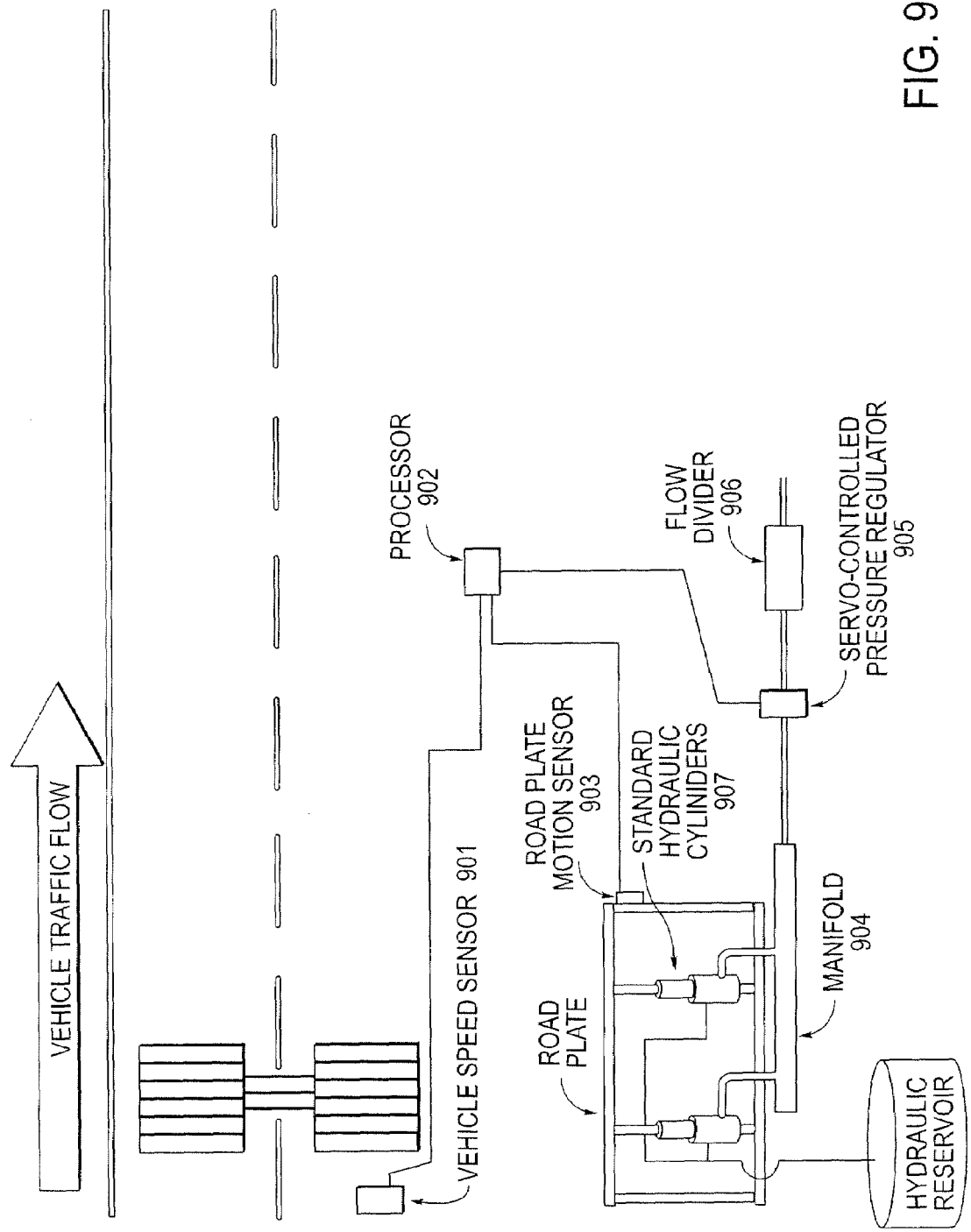
FIG. 9 is a diagram depicting an alternative embodiment of the system.
Figure 11:
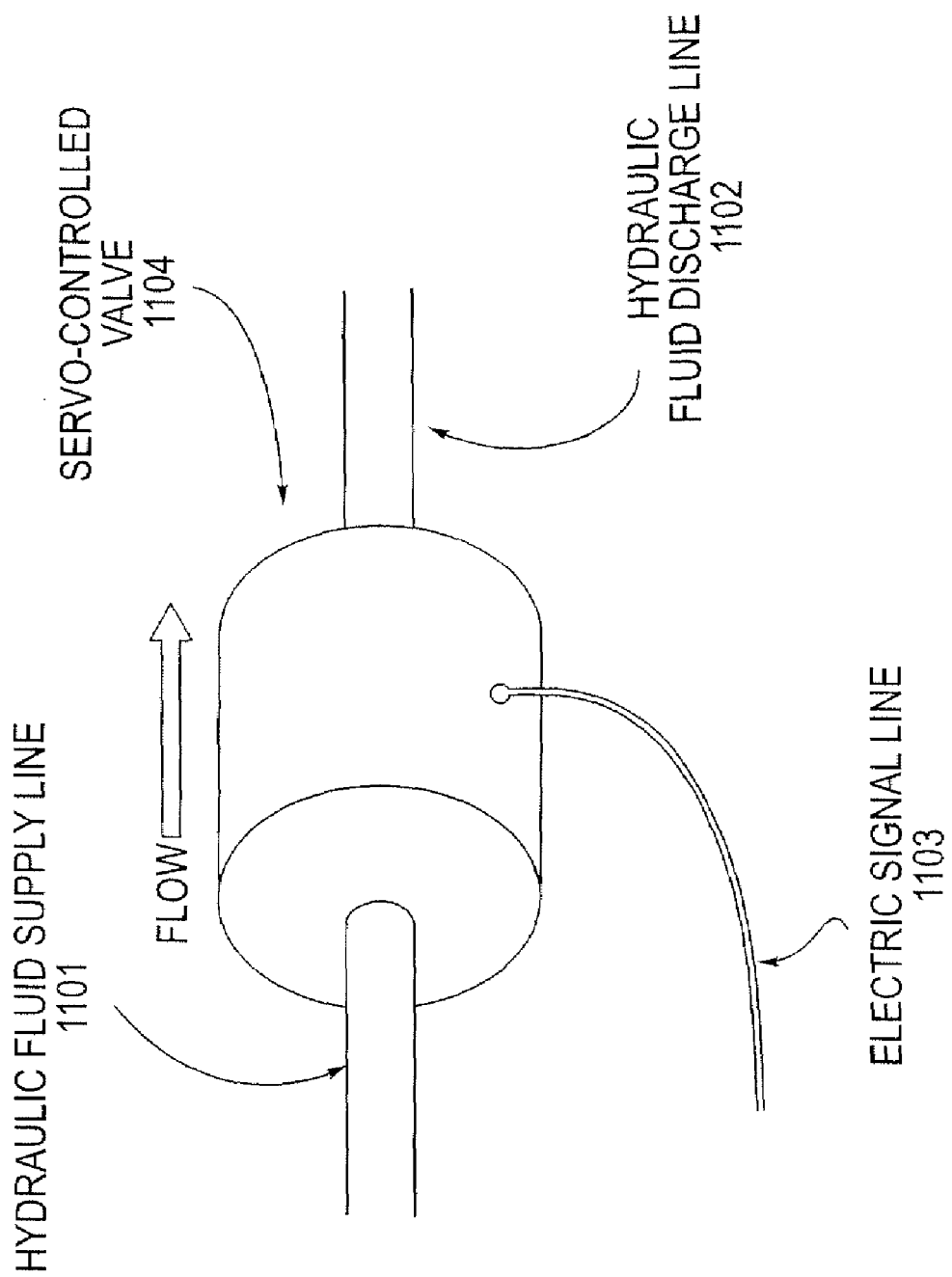
FIG. 11 depicts a servo-controlled pressure regulator

An alternative embodiment of the present invention is depicted in FIG. 9, in which the electric hydraulic cylinders may be replaced with standard hydraulic cylinders 907 that are fluidly connected to a manifold 904, no electro-mechanical generators are used, a servo-controlled pressure regulator device 905 (as depicted in FIG. 11) is used to regulate the pressure, and as a direct result, the volume of hydraulic fluid expelled from the standard hydraulic cylinders, a road plate motion sensor 903 is used to detect the rate at which the road plate is depressed while a vehicle is passing over it, a vehicle speed sensor 901 is used to detect the speed of a vehicle passing over the road plate, and an analog or digital processor 902 is used to combine the signals from the road plate motion sensor 903 and the vehicle speed sensor 901 in order to derive a control signal for the servo-controlled pressure regulator.

Figure 10:
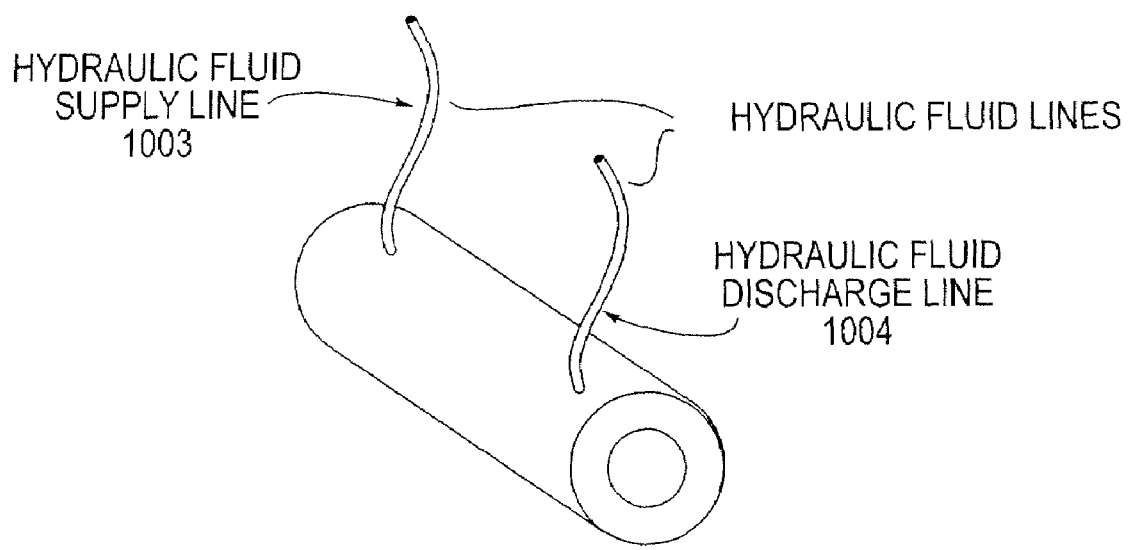
FIG. 10 depicts a standard hydraulic cylinder
Figure 10:
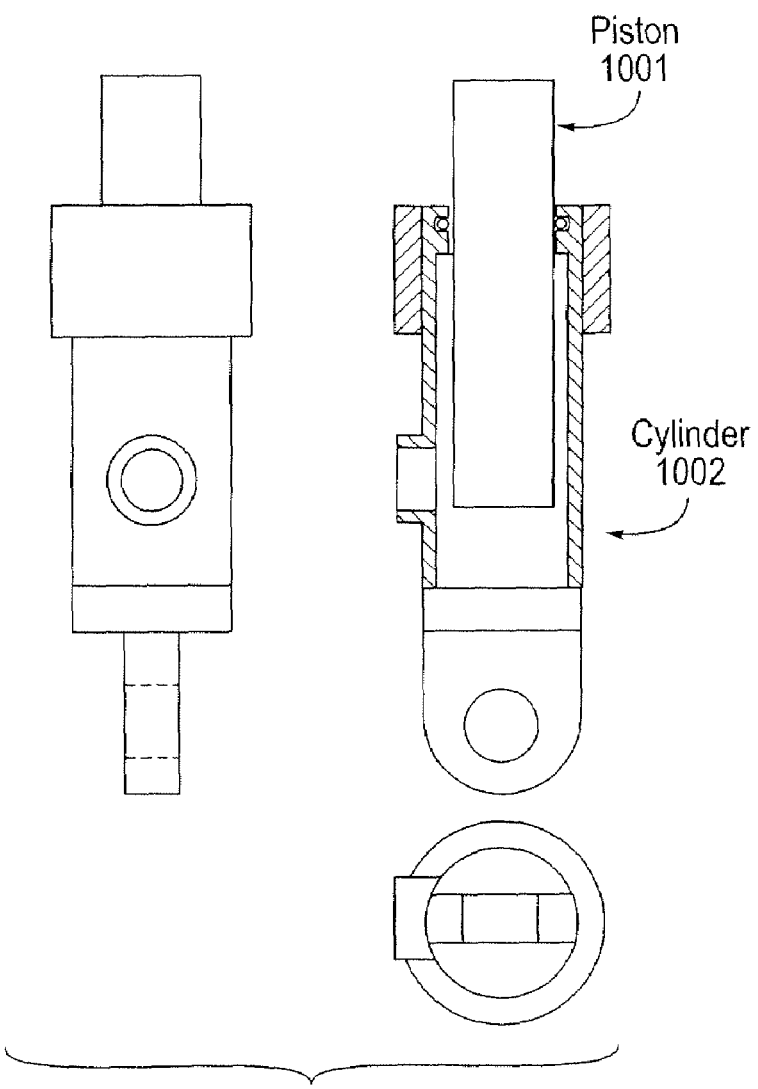

Referring to FIG. 10, the standard hydraulic cylinders themselves are preferably made of metal or other materials known to be suitable for such applications, and have a piston 1001 slidably disposed within the cylinder 1002, a hydraulic fluid supply line 1003 and a hydraulic fluid discharge line 1004. The standard hydraulic cylinders are activated when a vehicle passes over the road plate, and during the road plate's downward motion, hydraulic fluid is expelled from the standard hydraulic cylinders into a manifold 904.

The number of standard hydraulic cylinders used, as well as their size and hydraulic fluid capacity can vary and can be configured to meet the needs of the desired application. For example, the total capacity of the standard hydraulic cylinders disposed within a single road plate may be calculated so that the maximum vehicle weight expected for a given application will expel the total volume of hydraulic fluid in all such cylinders during such vehicle's passage over the road plate.

Servo-Controlled Pressure Regulator

Referring to FIG. 11, the servo-controlled pressure regulator is an electro-mechanical device designed to regulate the pressure of hydraulic fluid passing through an orifice in response to an analog or digital electrical signal, and may comprise a hydraulic fluid supply line 1101 and a hydraulic fluid discharge line 1102, an electrical signal line 1103, and a servo-controlled valve 1104.

Road Plate Motion Sensor

The road plate motion sensor 903 is a device designed to detect the velocity of a moving body and translate that velocity into a digital or analog electrical signal. Alternatively, the road plate motion sensor may be a device designed to detect the flow rate of hydraulic fluid being expelled from the standard hydraulic cylinders and thereby derive a digital or analog signal representing the velocity of the road plate.

Vehicle Speed Sensor

The vehicle speed sensor 901 is a device designed to detect the velocity of a moving vehicle and translate that velocity into a digital or analog electrical signal.

Method for Generating Electricity Using System

As a vehicle moves across the road plate component containing standard hydraulic cylinders, the rate at which the road plate descends in response to the weight of the vehicle is detected by the road plate motion sensor 903, and the speed of the vehicle is detected by the vehicle speed sensor 901. The signals from the road plate motion sensor and vehicle speed sensor are combined or otherwise processed by the processor 902 in order to derive an appropriate control signal (either analog or digital) for the servo-controlled pressure regulator 905. The appropriate control signal causes the servo-controlled pressure regulator 905 to adjust the pressure of the hydraulic fluid exiting the manifold 904, and therefore the flow rate of such fluid, in a manner calculated so as to allow the road plate to reach the limit of its downward travel at the same time the vehicle's tire is no longer in contact with the road plate. The hydraulic fluid exiting the servo-controlled pressure regulator 905 is then directed into a flow divider 906 designed to increase the pressure, but reduce the volume of such fluid, and the remainder of the power generation system is identical to the previously described embodiment. In this manner, vehicles of varying weight and traveling at varying speeds fully depress each road plate as it passes over it, and the system maximizes the amount of energy extracted from each passing vehicle.

The present system is designed to capture as much energy as possible from each vehicle, including light passenger vehicles to buses and heavy trucks, traveling at various speeds. Preferred locations for installation may include parking garages, shopping center or recreation/amusement park parking lots and similar locations with relatively steady vehicle traffic.

While the present system has been shown and described herein in what is considered to be the preferred embodiments thereof, illustrating the results and advantages over the prior art obtained through the present invention, the invention is not limited to the specific embodiments described above. Thus, the forms shown and described herein are to be taken as illustrative and other embodiments may be selected without departing from the spirit and scope of the present invention.

The embodiments described with reference to the Figures are exemplary only, and many other comparable configurations will be apparent to one of ordinary skill in the art.

Embodiments as described herein have significant advantages over previously developed implementations. As will be apparent to one of ordinary skill in the art, other similar apparatus arrangements are possible within the general scope. The embodiments described above are intended to be exemplary rather than limiting and the bounds should be determined from the claims.

What is claimed is:

1. A power generation system comprising:
   one or more electro-mechanical generators, and
   a hydro-electric power generator;
   at least two electric hydraulic cylinders coupled to one or more hydraulic accumulators coupled to a hydraulic motor, with at least one electric hydraulic cylinder having a lower weight-handling capacity and at least one electric hydraulic cylinder having a higher weight-handling capacity
   a road plate coupled to the one or more electro-mechanical generators, further coupled to the at least one electric hydraulic cylinder having the higher weight-handling capacity, and further coupled to the at least one electric hydraulic cylinder having the lower weight-handling capacity.

2. The system of claim 1 further comprising:
   at least one flow director coupled to the at least one electric hydraulic cylinder having the higher weight-handling capacity, and
   a vehicle weight sensor that is operable to control the flow director in response to a sensed vehicle weight.

3. The system of claim 2 wherein the flow director is operable to enable a hydraulic flow to the at least one electric hydraulic cylinder having the higher weight-handling capacity in response to the vehicle weight being heavier and further operable to inhibit the hydraulic flow to the at least one electric hydraulic cylinder having the higher weight-handling capacity in response to the vehicle weight being lighter.

4. The system of claim 3 further comprising:
   a road plate coupled to the one or more electro-mechanical generators,
   at least one electric hydraulic cylinder having the higher weight-handling capacity, and
   at least one electric hydraulic cylinder having the lower weight-handling capacity.

5. A power generation system comprising:
   one or more electro-mechanical generators;
   one or more road plates,
   one or more standard hydraulic cylinders fluidly connected to one or more servo-controlled pressure regulators connected to one or more hydraulic accumulators coupled to a hydraulic motor,
   one or more road plate motion sensors, and
   one or more vehicle speed sensors.

* * * * *